(12) United States Patent
Said et al.

(10) Patent No.: US 9,473,382 B2
(45) Date of Patent: Oct. 18, 2016

(54) METHOD AND SYSTEM FOR LINK AGGREGATION

(75) Inventors: Laith Said, Holstebro (DK); Daniel Derksen, The Hague (NL); Purvi Shah, Sunnyvale, CA (US); John Volkering, Harmelen (NL)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1199 days.

(21) Appl. No.: 12/997,595

(22) PCT Filed: Jun. 27, 2008

(86) PCT No.: PCT/EP2008/058314
§ 371 (c)(1),
(2), (4) Date: Jun. 30, 2011

(87) PCT Pub. No.: WO2009/155996
PCT Pub. Date: Dec. 30, 2009

(65) Prior Publication Data
US 2011/0258346 A1  Oct. 20, 2011

(51) Int. Cl.
*G06F 15/16* (2006.01)
*H04L 12/701* (2013.01)
*H04L 12/707* (2013.01)
*H04L 12/709* (2013.01)
*H04L 12/703* (2013.01)

(52) U.S. Cl.
CPC ............... *H04L 45/00* (2013.01); *H04L 45/22* (2013.01); *H04L 45/245* (2013.01); *H04L 45/28* (2013.01); *Y02B 60/33* (2013.01)

(58) Field of Classification Search
USPC ......... 370/217–221, 351, 389, 401; 709/236, 709/239, 249; 714/4.1, 4.11, 4.12, 4.2, 4.3
See application file for complete search history.

(56) References Cited

U.S. PATENT DOCUMENTS 7,848,264 B1 * 12/2010 Gai et al. .................... 370/256
7,983,152 B1 *  7/2011 Sivasankaran et al. ...... 370/218
(Continued)

OTHER PUBLICATIONS

Cisco Systems, Inc.,Cisco ASR 9000 Series Aggregation Services Router L2VPN and Ethernet Services Configuration Guide [online], Cisco IOS XR Software Release 4.0, retrieved on Dec. 18, 2012, Retrieved from the Internet< URL:http://www.cisco.com/en/US/docs/routers/asr9000/software/asr9k_r4.0/lxvpn/configuration/guide/lesc40book.pdf>, p. LSC-79.*
(Continued)

*Primary Examiner* — Farid Homayounmehr
*Assistant Examiner* — Zhimei Zhu
(74) *Attorney, Agent, or Firm* — Patent Portfolio Builders PLLC

(57) ABSTRACT

A method for providing Link Aggregation Control between a plurality of systems adapted for Link Aggregation is provided. The plurality of systems includes a primary system, a first secondary system, and a second secondary system. The primary system comprises first primary ports being linked to first ports of the first secondary system by first links. Further, the primary system comprises second primary ports being linked to second ports of the second secondary system by second links. The method comprises forming a link aggregation group, wherein the link aggregation group includes at least one first link and at least one second link. A preferred system among the secondary systems having links within the link aggregation group is selected and further, the method comprises setting the status of the primary ports according to the selection of the preferred system.

10 Claims, 6 Drawing Sheets

(56) References Cited

U.S. PATENT DOCUMENTS

| | | | |
|---|---|---|---|
| 8,131,871 B2* | 3/2012 | Paggen | 709/238 |
| 8,213,300 B1* | 7/2012 | Osswald et al. | 370/218 |
| 2002/0021661 A1* | 2/2002 | DeGrandpre et al. | 370/219 |
| 2003/0048746 A1* | 3/2003 | Guess et al. | 370/219 |
| 2003/0061533 A1* | 3/2003 | Perloff et al. | 714/9 |
| 2004/0098501 A1* | 5/2004 | Finn | 709/236 |
| 2005/0243713 A1* | 11/2005 | Okuda | 370/216 |
| 2005/0265330 A1* | 12/2005 | Suzuki et al. | 370/389 |
| 2006/0165077 A1 | 7/2006 | Wybenga et al. | |
| 2007/0183376 A1* | 8/2007 | Arai et al. | 370/338 |
| 2007/0207591 A1 | 9/2007 | Rahman et al. | |
| 2007/0253327 A1 | 11/2007 | Saha et al. | |
| 2008/0037418 A1* | 2/2008 | Cole et al. | 370/220 |
| 2008/0181196 A1* | 7/2008 | Regan et al. | 370/351 |
| 2008/0240133 A1* | 10/2008 | Tanaka | 370/401 |
| 2008/0285555 A1* | 11/2008 | Ogasahara | 370/389 |
| 2008/0304498 A1* | 12/2008 | Jorgensen et al. | 370/401 |
| 2009/0003206 A1* | 1/2009 | Bitar | 370/230.1 |
| 2010/0110880 A1* | 5/2010 | Kulkarni et al. | 370/221 |

OTHER PUBLICATIONS

PCT International Search Report, mailed Mar. 31, 2009, in connection with International Application No. PCT/EP2008/058314.

International Preliminary Report on Patentability, mailed Sep. 29, 2010, in connection with International Application No. PCT/EP2008/058314.

Lapuh, R. et al. "Split Multi-link trunking (SMLT)" Internet Citation [Online] XP002298970. Retrieved from the Internet: URL:http://mirrors.isc.org/pub/www.watersprings.org/pub/id/draft-lapuh-network-smlt-02.txt.

CN Office Action mailed Mar. 5, 2013 in related Application No. 200880130193.5 (Reference cited in this OA was previously provided to USPTO with IDS filed Jun. 30, 2011).

Second Chinese Office Action in related Application No. 200880130193.5 mailed Dec. 3, 2013.

* cited by examiner

METHOD AND SYSTEM FOR LINK AGGREGATION

TECHNICAL FIELD

The present invention relates to a method and system for link aggregation, in particular, a method for providing Link Aggregation Control between a plurality of systems adapted for Link Aggregation including a primary system, a first secondary system, and a second secondary system.

BACKGROUND

Ethernet network redundancy is an important feature for access providers to secure the availability of the services offered on the access network.

Ethernet network redundancy is the ability of the network to survive a link failure or a node failure by providing an alternative data path when the fault occurs.

Ethernet network redundancy can be achieved using different protocols, e.g.:
Link Aggregation (IEEE 802.3-2005)
STP (IEEE 802.1D-2004, and IEEE 802.1Q-2003)
EAPS (RFC3619)
Spanning Tree Protocol (STP) and Rapid Spanning Tree Protocol (RSTP) can provide node fault protection, however with high convergence times.

Further, Ethernet Automatic Protection Switching (EAPS) is able to provide node fault protection, however EAPS is designed for ring topologies and based on defining a master node to control the direction of the traffic flow. Further, EAPS is not easy to implement in Multi-Protocol Label Switching (MPLS) networks and is not easily deployable, since EAPS requires predefining the VLANs used within an EAPS domain, which means that the user must stop all the services before a new VLAN can be added to this domain.

SUMMARY

Accordingly, there is a need for improved methods and systems for obtaining Ethernet network redundancy.

A method for providing Link Aggregation Control between a plurality of systems adapted for Link Aggregation is provided. The plurality of systems include a primary system having a primary system identifier, a first secondary system having a first system identifier, and a second secondary system having a second system identifier.

The primary system comprises a first set of primary ports being linked to a first set of ports of the first secondary system by at least one first link. Further, the primary system comprises a second set of primary ports being linked to a second set of ports of the second secondary system by at least one second link. The method comprises forming a link aggregation group, wherein the link aggregation group includes at least one first link between the primary system and the first secondary system and at least one second link between the primary system and the second secondary system. A preferred system among the secondary systems having links within the link aggregation group is selected and further, the method comprises setting the status of the primary ports according to the selection of the preferred system.

Further, a system being adapted for link aggregation is provided. The system has a system identifier and comprises a link aggregation control unit connected to an aggregator unit. The link aggregation control unit is adapted for forming a link aggregation group comprising at least one first link between the system and a first secondary system having a first system identifier and at least one second link between the system and a second secondary system having a second system identifier. Further, the link aggregation control unit is adapted for selecting a preferred system among the secondary systems having links within the link aggregation group, and setting the status of the primary ports according to the selection of the preferred secondary system.

The method and system of the present invention provides node fault-protection in a LAG system. In order to achieve this feature, the system must be capable of aggregating links from a plurality of systems having different identifiers; therefore this feature is called Multi-Systems Link Aggregation Group (MS-LAG).

In addition to the general advantages of a LAG system, it is an advantage of the present invention that node fault protection is provided. Further, it is advantageous that the present invention is easy to implement for MPLS networks.

A further advantage resides in that the method and system according to the present invention do not require changes on the interconnected systems, which will only need to support Link Aggregation Control Protocol (LACP).

Further, the method and system of the present invention is able to provide fast link/node failure detection and switch over (within a few milliseconds in the order of 10-20 milliseconds) depending on the implementation of the system.

BRIEF DESCRIPTION OF THE DRAWINGS

The above and other features and advantages of the present invention will become readily apparent to those skilled in the art by the following detailed description of exemplary embodiments thereof with reference to the attached drawings, in which.

ABBREVIATIONS

Figure 1:
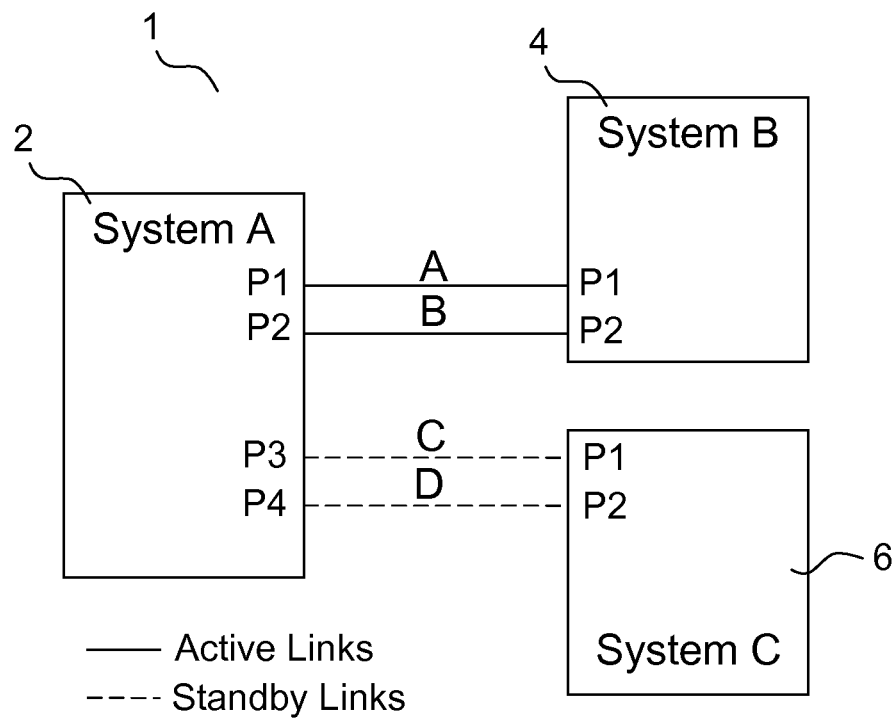
FIG. 1 illustrates systems employing the method according to the present invention.

EAPS Ethernet Automatic Protection Switching
LACP Link Aggregation Control Protocol
LAG Link Aggregation Group
MPLS Multi Protocol Label Switching
MS-LAG Multi Systems—Link Aggregation Group
RSTP Rapid Spanning Tree Protocol
STP Spanning Tree Protocol
VLAN Virtual Local Area Network

DETAILED DESCRIPTION

The figures are schematic and simplified for clarity, and they merely show details which are essential to the understanding of the invention, while other details have been left out. Throughout, the same reference numerals are used for identical or corresponding parts.

Throughout the present description, ports are referred to as active or standby. An active port refers to a port being "selected+attached" using IEEE terminology. A standby port refers to a port being "selected" but not "attached" using IEEE terminology.

In an embodiment of the method according to the present invention, the step of selecting a preferred system comprises selecting the secondary system by a selection criterion based on the system priority values of the secondary systems in the link aggregation group. Preferably, the secondary system having the highest priority is selected, however an embodiment, where the secondary system having the lowest priority is selected is possible.

System priority may not be an adequate selection criterion, e.g. if the secondary system priorities are the same.

Further, it may be desirable to provide the largest possible bandwidth at any time.

Accordingly, the step of selecting a preferred system may alternatively or in combination with the priority-based selection criterion comprise selecting the secondary system by a selection criterion based on the number of links to each of the secondary systems in the link aggregation group.

In the method according to the present invention, the step of setting the status of the primary ports according to the selection of the preferred system may comprise setting the primary ports not linked to the preferred system to standby. Further, the step of setting the status of the primary ports according to the selection of the preferred system may comprise setting the primary ports linked to the preferred system to active.

Preferably, the method according to the invention further comprises the following steps of evaluating the at least one link between the primary system and the preferred system according to a criterion and in case the criterion is not fulfilled, selecting an alternative preferred system among the other secondary systems having links within the link aggregation group, and setting the status of the primary ports according to the selection of the preferred system.

The step of evaluating the at least one link according to a criterion and the step in case the criterion is not fulfilled may be repeated until the criterion is fulfilled or links to all secondary systems have been evaluated. In case the criterion is not fulfilled for any of the secondary systems in the link aggregation group, the method may comprise setting all primary ports to standby. The step of setting all primary ports to standby may comprise sending an alarm message to the operator or a monitoring unit of the system.

FIG. 1 illustrates systems providing Link Aggregation Control between a plurality of systems 1 adapted for Link Aggregation. The plurality of systems include a primary system 2 (System A) having a primary system identifier, a first secondary system 4 (System B) having a first system identifier, and a second secondary system 6 (System C) having a second system identifier. The primary system 2 has formed a link aggregation group comprising first links A and B between the primary system 2 and the first secondary system 4, and second links C and D between the primary system and the second secondary system 6.

The system identifier is composed from the system priority and system MAC address indicating the priority of the system in question. In the illustrated embodiment, the primary system 2 has higher priority than the secondary systems 4, 6, i.e. the primary system priority is higher than the first secondary system priority and the second secondary system priority.

The first links A and B are formed between a first set of primary ports $P_1$ and $P_2$ of the primary system 2 and first ports $P_1$ and $P_2$ of the first secondary system 4, respectively.

The second links C and D are formed between a second set of primary ports $P_3$ and $P_4$ of the primary system 2 and second ports $P_1$ and $P_2$ of the second secondary system 6, respectively.

The primary system, i.e. a system according to the present invention, is adapted to aggregate any number of links between the primary system and the secondary systems, i.e. the link aggregation group may comprise any number of links, e.g. one or more first links and/or one or more second links.

The primary system has selected a preferred system among the secondary systems having links in the link aggregation group. The selection of the preferred system is performed according to a selection criterion. In the illustrated embodiment, the preferred system is the secondary system having the highest system priority. The first secondary system priority is higher than the second secondary system priority, and accordingly, the links A and B between the primary system and the first secondary system are activated, i.e. the first set of primary ports $P_1$ and $P_2$ are active. Further, the links C and D between the standby system (System C) are set to standby, i.e. the second set of ports $P_3$ and $P_4$ are set to standby.

The primary system evaluates the status of the first links A and B, and in case the primary system detects that a criterion is not fulfilled, e.g. that one or more of the first links are down and/or that a minimum number of first links are not active, the primary system will select the second secondary system as the preferred system and change the status of the primary ports accordingly, i.e. change the state of the second set of ports $P_3$ and $P_4$ to active, thereby activating links C and D. Further, the first set of primary ports $P_1$ and $P_2$ will be standby. Loss of all links indicates node failure in system B.

The criterion may be a minimum links requirement configured for each Link Aggregation Group or a default value for all Link Aggregation Groups. In the illustrated embodiment, the criterion is a minimum links requirement setting that the minimum number of active links must be at least one. Thus, the primary system will select the second secondary system as preferred or active secondary system if the number of active links between the primary system and the preferred system is not one or more. The minimum links requirement may be any number of links, e.g. one, two, three, four, or more.

Accordingly, system A utilizes primary ports $P_1$ and $P_2$ for traffic aggregation and primary ports $P_3$ and $P_4$ for node redundancy.

The first and second sets of primary ports may comprise any number of ports corresponding to any number of links to the first and second secondary systems, respectively, e.g. the first and second sets of primary ports may each comprise one, two, three, four, five, six or more primary ports. In an embodiment the total number of ports in a LAG is eight, e.g. four ports in the first set and four ports in the second set.

It is an important advantage of the present invention that implementation or use of the system and method according to the present invention does not require any changes in the LACP implementation of the secondary systems.

Figure 2:
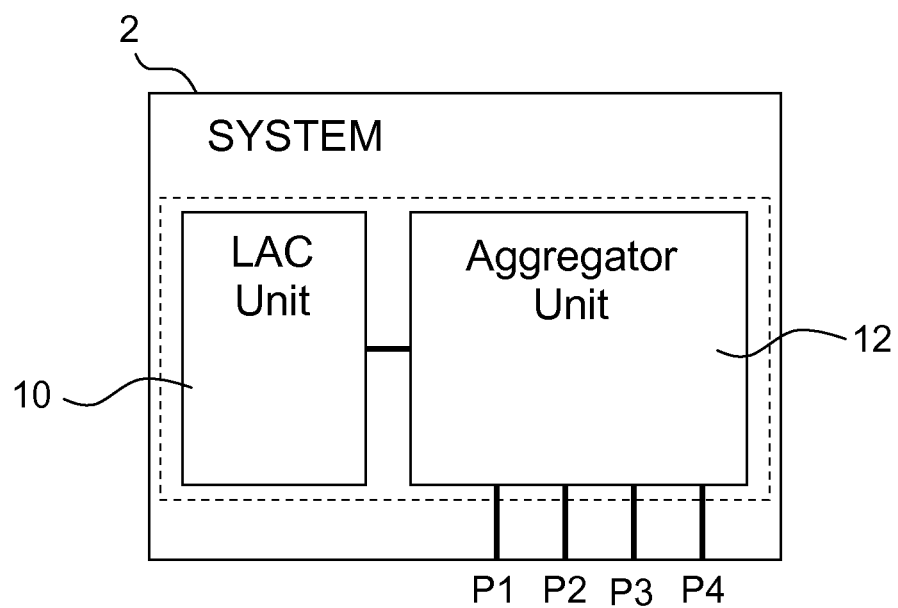
FIG. 2 illustrates an embodiment of the system according to the present invention.

FIG. 2 illustrates an embodiment of the system according to the present invention. The system illustrated in FIG. 2 may constitute the primary system of the method according to the present invention. The system 2 comprises a Link Aggregation Control (LAC) unit 10 adapted to operate according to a Link Aggregation Control Protocol (e.g.

IEEE.802.3-2005 extended as described herein or corresponding). The LAC unit 10 is connected to an aggregator unit 12 adapted to aggregate ports according to control signals from the LAC unit 10.

The LAC unit 10 in the system 2 is adapted for forming a link aggregation group comprising links to a plurality of secondary systems including at least one first link between the system 2 and a first secondary system having a first system identifier and at least one second link between the system and a second secondary system having a second system identifier.

Further, the LAC unit 10 is adapted for selecting a preferred system among the secondary systems having links within the link aggregation group. The selection is based on a selection criterion, which in this embodiment is "select secondary system having highest system priority". Alternatively or in combination, the selection criterion may be based on the number of links to each secondary system, e.g. if the number of links to the second secondary system is larger than the number of links to the first secondary system, the second secondary system is selected. Further, the LAC unit 10 is adapted to setting the status of the primary ports $P_1$, $P_2$, $P_3$ and $P_4$ according to the selection of the preferred secondary system.

The LAC unit 10 is adapted to set primary ports linked to the selected and preferred secondary system to active and the primary ports linked to other systems having links included in the link aggregation group are set to standby.

In an embodiment, where primary port $P_1$ is linked to a first port of a first secondary system and primary ports $P_2$, $P_3$ and $P_4$ are linked to second ports of a second secondary system, and wherein the first secondary system has higher system priority than the second secondary system, the LAC unit 10 may be adapted to select the first secondary system because the first secondary system has highest priority. In another embodiment, the LAC unit 10 may be adapted to select the second secondary system because the second secondary system has the largest number of links to the system 2. The selection criterion may be a combination of system priority and number of links (i.e. available bandwidth). For example, the "number of links" criterion may be applied if the first and second secondary systems have the same system priority.

In an embodiment, the system 2 is adapted to perform the steps of the method according to the present invention.

Preferably, the system 2 is adapted to form a link aggregation group consisting of two secondary systems in order to minimize the number of secondary systems in standby mode; however the system may be adapted to form a link aggregation group comprising links from any number of secondary systems.

The different embodiments of the method will be described with reference to the plurality of systems illustrated in FIG. 1. The invention is neither limited to a specific number of links nor to a specific plurality of secondary systems aggregated in a link aggregation group.

Figure 3:
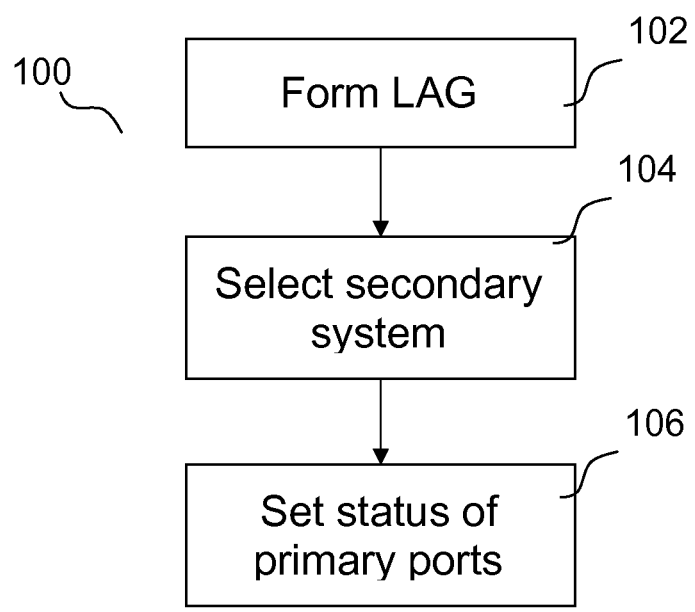
FIG. 3 is a flow diagram illustrating a first embodiment of the method according to the invention.

FIG. 3 illustrates a flow diagram of a first embodiment 100 of the method according to the invention.

In the illustrated embodiment, the primary system is configured to aggregate secondary systems with first secondary system identifier and second secondary system identifier.

The method is triggered whenever LACP state change occurs. Upon receiving LACPDU packets from the first secondary system and the second secondary system, the primary system identifies ports $P_1$, $P_2$, $P_3$, and $P_4$ as aggregateable ports and form a LAG comprising links A, B, C, and D on these ports in step 102. Upon forming the LAG, the method proceeds to step 104 of selecting a preferred system among the first and second secondary system having links within the LAG in question. In this embodiment, the secondary system with highest priority (System B in FIG. 1) is selected. Upon selecting the preferred secondary system, the method 100 proceeds to the step 106 of setting the status of the primary ports according to the selection of the preferred system, i.e. activate the primary ports towards the selected system (primary ports $P_1$ and $P_2$ connected to first secondary system in FIG. 1) and set primary ports towards remaining secondary systems to standby (primary ports $P_3$ and $P_4$ connected to second secondary system in FIG. 1).

Figure 4:
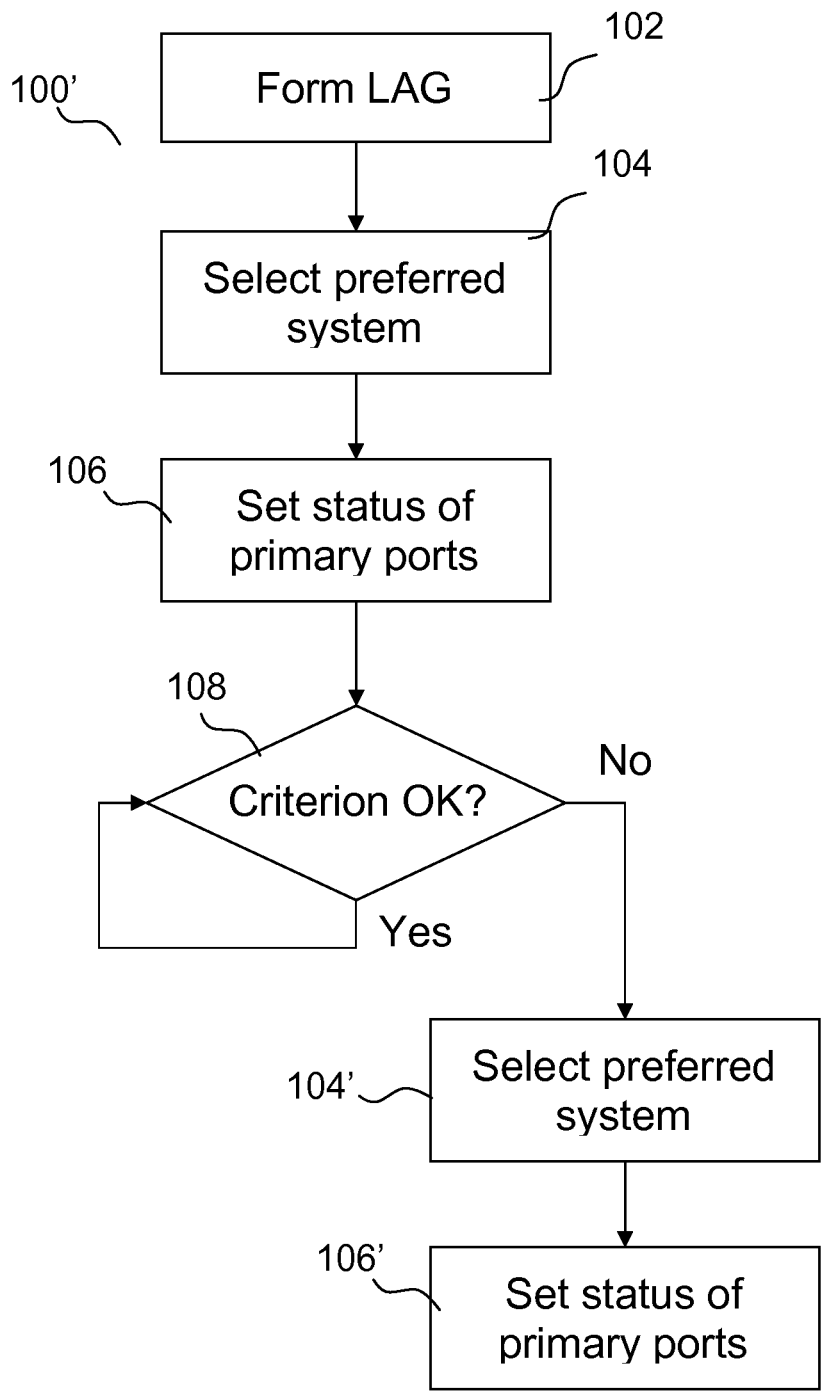
FIG. 4 is a flow diagram illustrating a second embodiment of the method according to the invention.

FIG. 4 illustrates a flow diagram of a second embodiment 100' of the method according to the invention. In addition to the steps already explained in connection with FIG. 3, the method 100' comprises the step 108 of evaluating the at least one link between the primary system and the preferred system according to a criterion, e.g. a minimum active links requirement. In case the criterion is not fulfilled in step 108, the method 100' proceeds to the step 104' of selecting a preferred system among the other secondary systems having links within the link aggregation group, and subsequently to the step 106' of setting the status of the primary ports according to the selection of the preferred system in step 104'.

Figure 5:
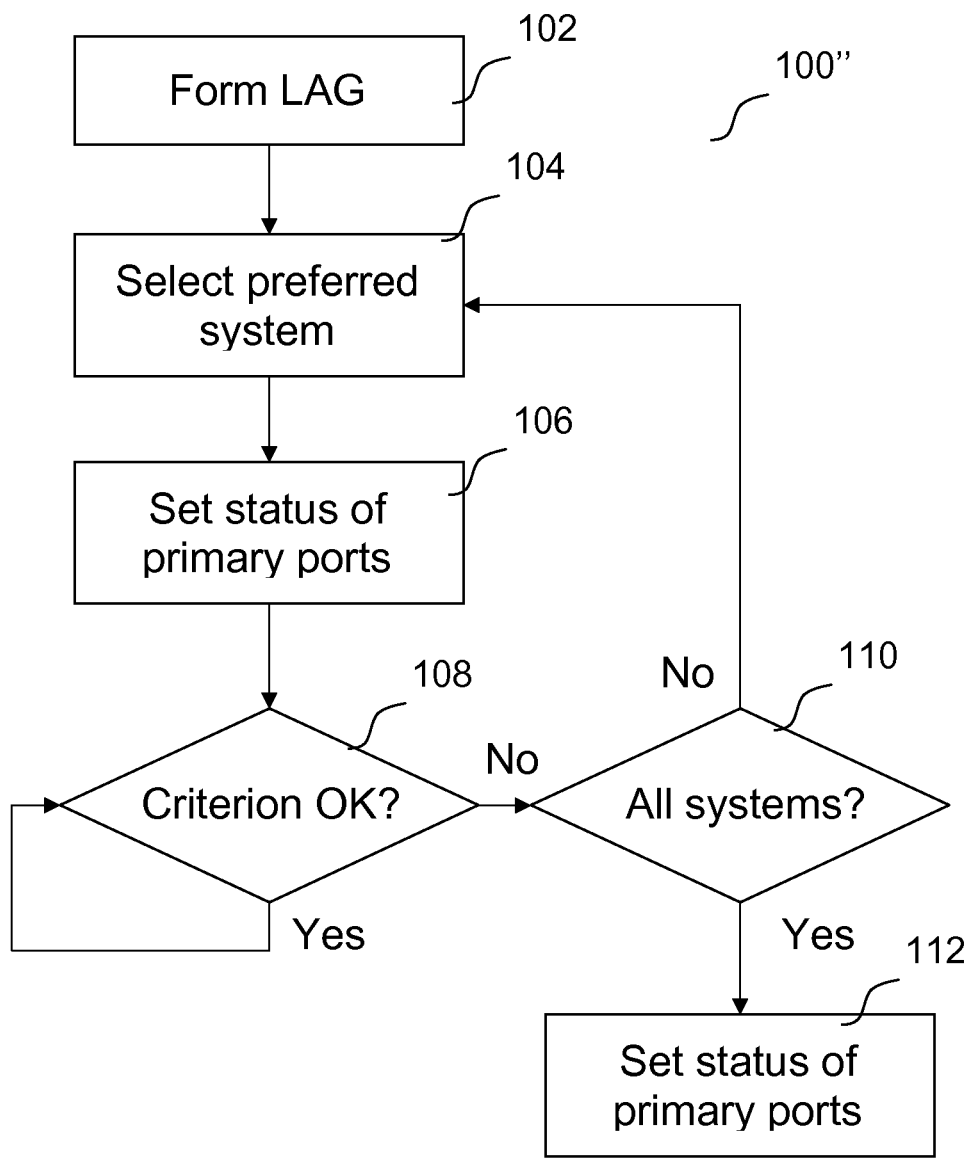
FIG. 5 is a flow diagram illustrating a third embodiment of the method according to the invention.

The method or certain parts of the method according to the present invention may be triggered by LACP state changes. In an embodiment a LACP state change may cause a reselection of preferred secondary system without the need for reforming the LAG FIG. 5 illustrates a flow diagram of a third embodiment 100" of the method according to the invention. In the method 100", the method upon evaluation of the criterion in step 108 proceeds to the step 110 of checking if all secondary systems have been selected as preferred system. i.e. if links to all secondary systems have been evaluated. If not, steps 104 and 106 are repeated with selection of a preferred secondary system among the secondary systems not selected before, and setting the status of primary ports accordingly. In case none of the secondary systems fulfill the criterion in step 108, the method 100" proceeds to the step 112 of setting all primary ports to standby from the step. Step 112 may comprise sending an alarm message to the operator or a monitor function of the system.

In a preferred embodiment of the present invention, the primary system has higher system priority than any of the secondary systems in order to be able to set status of and decide, which ports that can be aggregated.

Figure 6:
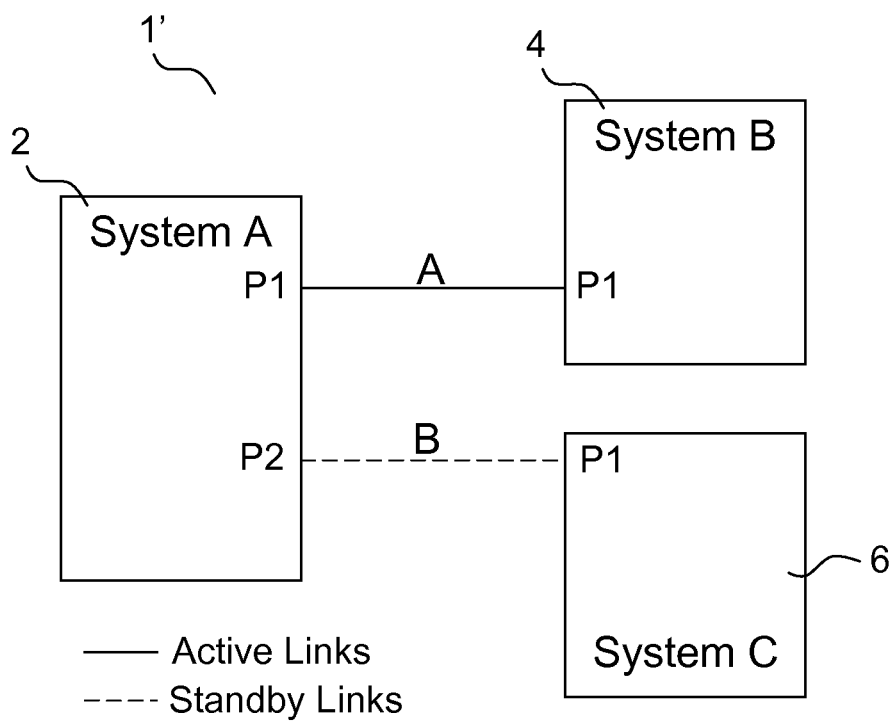
FIG. 6 illustrates systems employing the method according to the present invention.

FIG. 6 illustrates an embodiment where only one link is set up between the primary system and the first secondary system and only one link is set up between the primary system and the second secondary system. The link aggregation group in this case comprises the first link A and the second link B. In case the first link A fails, the primary system activates the second primary port $P_2$ and sets the first primary port $P_1$ to standby.

It should be noted that in addition to the exemplary embodiments of the invention shown in the accompanying drawings, the invention may be embodied in different forms and should not be construed as limited to the embodiments set forth herein. Rather, these embodiments are provided so that this disclosure will be thorough and complete, and will fully convey the concept of the invention to those skilled in the art.

The invention claimed is:

1. A method in a primary system for providing Link Aggregation Control between a plurality of systems adapted for Link Aggregation and including the primary system having a primary system identifier, a first secondary system having a first system identifier, and a second secondary system having a second system identifier, the primary system comprising a first set of primary ports being linked to a first set of ports of the first secondary system by first links, the primary system further comprising a second set of primary ports being linked to a second set of ports of the second secondary system by second links, wherein the method comprises the steps of:

forming in said primary system a link aggregation group, wherein the link aggregation group includes at least one first link between the primary system and the first secondary system and at least one second link between the primary system and the second secondary system;

selecting in said primary system a preferred system among the secondary systems having links within the link aggregation group;

setting in said primary system the status of the primary ports according to the selection of the preferred system;

evaluating in said primary system the at least one link between the primary system and the preferred system according to a minimum active links requirement; and in case the minimum active links requirement is not fulfilled, selecting an alternative preferred system among the other secondary systems having links within the link aggregation group, and setting the status of the primary ports according to the selection of the preferred system, wherein the step of selecting the preferred system comprises selecting the secondary system by a selection criterion based on the number of links to each of the secondary systems in the link aggregation group.

2. The method according to claim 1, wherein the step of selecting the preferred system comprises selecting the secondary system by an additional selection criterion based on the system priority values of the secondary systems in the link aggregation group.

3. The method according to claim 1, wherein the step of setting the status of the primary ports according to the selection of the preferred system comprises setting the primary ports not linked to the preferred system to standby.

4. The method according to claim 1, wherein the step of setting the status of the primary ports according to the selection of the preferred system comprises setting the primary ports linked to the preferred system to active.

5. The method according to claim 1, further comprising the step of setting all primary ports to standby in case the criterion is not fulfilled for any of the secondary systems in the link aggregation group.

6. A primary system for storing and executing computer instructions being adapted for link aggregation and having a primary system identifier, wherein the primary system comprises a link aggregation control unit connected to an aggregator unit, wherein the link aggregation control unit is adapted for:

forming a link aggregation group comprising at least one first link between the primary system and a first secondary system having a first system identifier and at least one second link between the primary system and a second secondary system having a second system identifier;

selecting a preferred system among the secondary systems having links within the link aggregation group;

setting the status of the links according to the selection of the preferred secondary system;

evaluating the at least one link between the primary system and the preferred system according to a minimum active links requirement; and in case the minimum active links requirement is not fulfilled, selecting an alternative preferred system among the other secondary systems having links within the link aggregation group, and setting the status of the links according to the selection of the preferred system, wherein the step of selecting the preferred system comprises selecting the secondary system by a selection criterion based on the number of links to each of the secondary systems in the link aggregation group.

7. The system according to claim 6, wherein the step of selecting the preferred system comprises selecting the secondary system by an additional selection criterion based on the system priority values of the secondary systems in the link aggregation group.

8. The system according to claim 6, wherein the step of setting the status of the primary ports according to the selection of the preferred system comprises setting the primary ports not linked to the preferred system to standby.

9. The system according to claim 6, wherein the step of setting the status of the primary ports according to the selection of the preferred system comprises setting the primary ports linked to the preferred system to active.

10. The system according to claim 6, further comprising the step of setting all primary ports to standby in case the criterion is not fulfilled for any of the secondary systems in the link aggregation group.

* * * * *